United States Patent [19]
Cooper

[11] Patent Number: 5,592,508
[45] Date of Patent: Jan. 7, 1997

[54] ANALOG SIGNAL CODING AND TRANSMISSION APPARATUS AND METHOD CAPABLE OF OPERATION WITH MULTIPLE TYPES OF ANALOG AND DIGITAL SIGNALS

[76] Inventor: J. Carl Cooper, 15288 Via Pinto, Monte Sereno, Calif. 95030

[21] Appl. No.: 310,689

[22] Filed: Sep. 22, 1994

[51] Int. Cl.$^6$ ................................................ H04L 25/00
[52] U.S. Cl. ...................... 375/216; 375/259; 375/355; 375/377; 348/554; 348/555; 348/572; 348/659; 341/143; 341/899; 364/180; 395/889; 395/890
[58] Field of Search ............................ 375/216, 242, 375/245, 259, 295, 322–324, 359, 377; 348/445, 455, 458, 459, 554, 555, 556, 572, 659, 660; 341/88, 77, 108, 143, 899; 455/93, 102; 395/882–883, 889, 890; 364/180–182; 370/110.1–110.4, 119

[56] References Cited

U.S. PATENT DOCUMENTS

| | | | |
|---|---|---|---|
| 3,949,299 | 4/1976 | Song | 375/250 |
| 4,581,746 | 4/1986 | Arnold | 375/216 |
| 5,339,111 | 8/1994 | Park | 348/555 |
| 5,345,406 | 9/1994 | Williams | 364/724.01 |
| 5,418,815 | 5/1995 | Ishikawa et al. | 375/216 |

*Primary Examiner*—Stephen Chin
*Assistant Examiner*—Amanda T. Le
*Attorney, Agent, or Firm*—J. Carl Cooper

[57] ABSTRACT

The apparatus and method describes herein shows a system of digitizing analog or digital electronic or optical signals with very high single bit serial digital data streams which digitizing is suitable to automatically adapt the transmission of multiple types of analog and digital signals. The system is especially well suited for allowing the coupling and transmission of signals.

19 Claims, 8 Drawing Sheets

ANALOG SIGNAL CODING AND TRANSMISSION APPARATUS AND METHOD CAPABLE OF OPERATION WITH MULTIPLE TYPES OF ANALOG AND DIGITAL SIGNALS

BACKGROUND OF THE INVENTION

The invention relates to the coupling and transmission of various types of analog and digital signals, including standard analog NTSC, SECAM, PAL and HDTV signals as well as serial digital versions thereof in complex television systems. These signals may be in electronic form or optical form and in either form may take on analog or digital form. In todays television technology, it is often necessary to route or couple television signals having many different formats throughout the television facility. Because of the use of many different formats, it has heretofore been required to utilize extremely wide bandwidth analog and separate parallel digital systems and cabling. This multiplicity of required equipment and cabling causes much complexity and cost in such systems.

1. Field of the Invention

The invention relates to the field of coupling and transmission of various types of analog and digital signals, and in particular analog and digital television video, audio, ancillary and control signals.

2. Description of the Prior Art

In many television facilities, it is necessary to provide large switching and routing networks in order to couple signals from the output of one particular source to the input of another particular processor or user of the signal. To perform these functions, large routing switchers and patch matrix panels provide matrix switching of signals utilized in the television facilities. Typically matrices of 128×128 are utilized which are capable of coupling any of the 128 input to any number of the 128 outputs in a completely arbitrary manner. Matrices larger than 128×128 are also used. These large matrices require a large number of individual switches, or crosspoints, with a 128×128 router requiring 16,384 such crosspoints.

Because of the use of many different formats, it has heretofore been required to utilize separate extremely wide bandwidth analog routers for analog signals and separate parallel digital routers for digital signals, with multiple versions of each such analog or digital systems and cabling being required due to the specialized needs of each type of signal used. For example, in a television station which uses 4 audio channels, i.e. stereo for two languages, analog time code, digital time code, PAL video in analog form, NTSC video in analog form and PAL or NTSC video in digital form, to implement 128×128 routing for all of these signals would require several times the previously mentioned 16,384 crosspoints, some of which are tailored to video, some to audio, etc. This multiplicity of required equipment and cabling causes much complexity and cost in such systems.

SUMMARY OF THE INVENTION

The invention described herein utilizes an analog to digital convertor which is relatively immune to particular peculiarities of different analog signals, is suitable for use with digital signals and may be easily adjusted to accommodate changes in widely divergent types of analog or digital signals, including signals of different forms, formats, bandwidths and precision. The invention provides an analog to serial digital coder which may automatically pass and maintain already digitized signals, which coder may also automatically adjust to accommodate different bandwidth, precision or format of analog or digital signals in electronic or optical form, for example audio or video. The invention also shows a novel routing switcher which makes use of the serial digital version of the input signal to provide high quality and relatively low cost routing of signals which may signals be automatically accommodated in different forms or formats. The invention may be used to pass said signals through synchronous or asynchronous information channels. By using a single serial bit stream to convey the input signal, no matter what the input signal form, format or bandwidth, the processing, transmission and routing of the serial bit stream is the same for all input signal types.

DESCRIPTION OF THE PREFERRED EMBODIMENT

Figure 1:
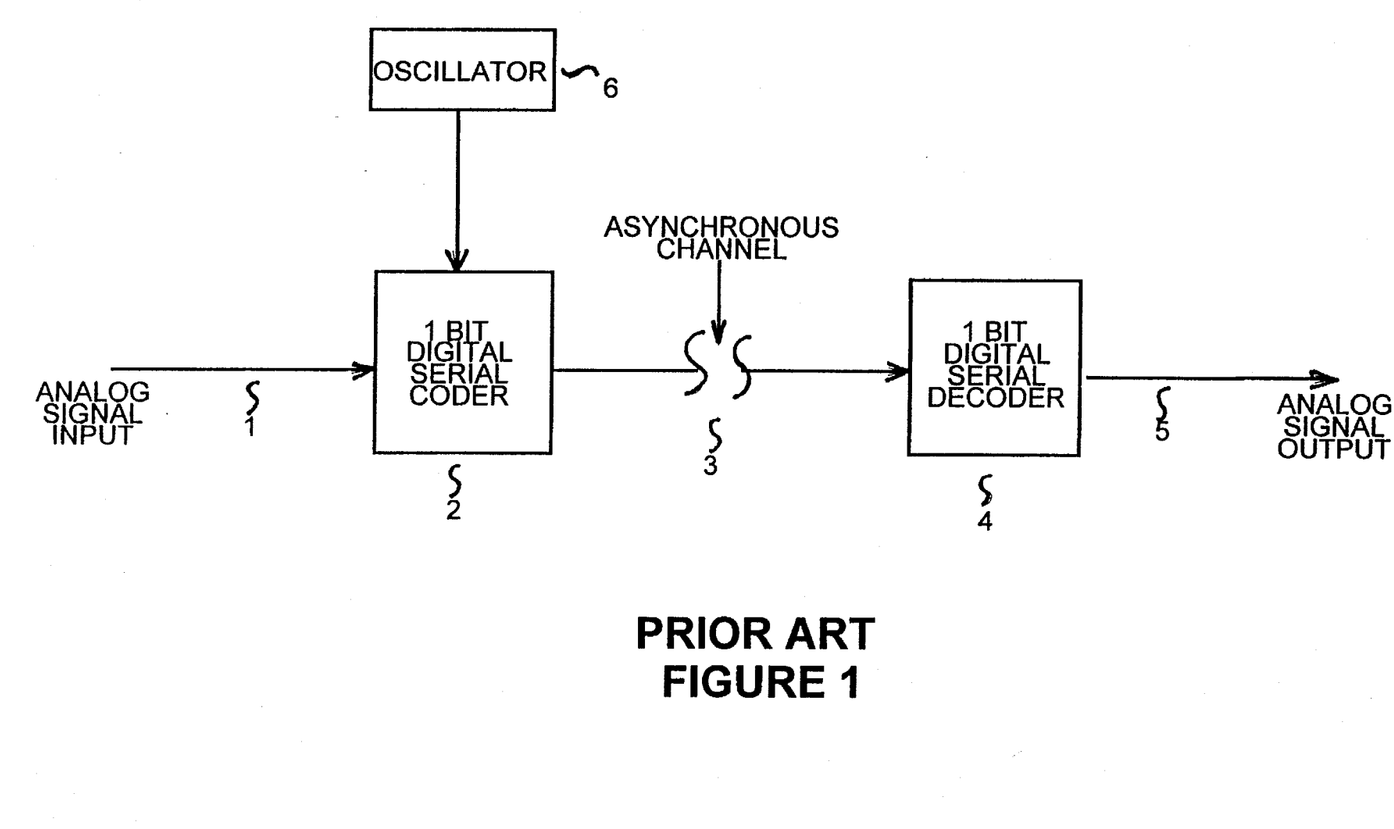
FIG. 1 is a prior art serial digital coder system as used to digitize and pass an analog signal of a single known type through an asynchronous channel.

FIG. 1 is a prior art serial digital coder system responsive to an electronic analog signal input at input 1, which electronic analog signal is of a single known type. An oscillator 6 provides a clocking signal which is used by a 1 bit digital serial coder 2 to digitize the electronic analog signal into a digital electronic serial bit stream. The serial bit stream is passed through an asynchronous channel 3 to a 1 bit digital serial decoder 4 where it is converted to an electronic analog output signal supplied on output 5. Systems of this type are commonly used to digitize a known single type of analog signal such as audio or video or other type. The systems are engineered specifically to match a particular type of electronic analog signal input, and are for the most part unable to cope with input signals of widely divergent types. It is believed for example that such systems are incapable of accepting either an analog video signal or an already digitized video signal or an analog audio signal or a digitized audio signal, all without substantial changes to the circuitry.

While the family of delta type modulators is often used for the coder 2, these prior art systems still suffer from the inability to operate with widely divergent types of signals without substantial changes to the circuitry.

Figure 2:
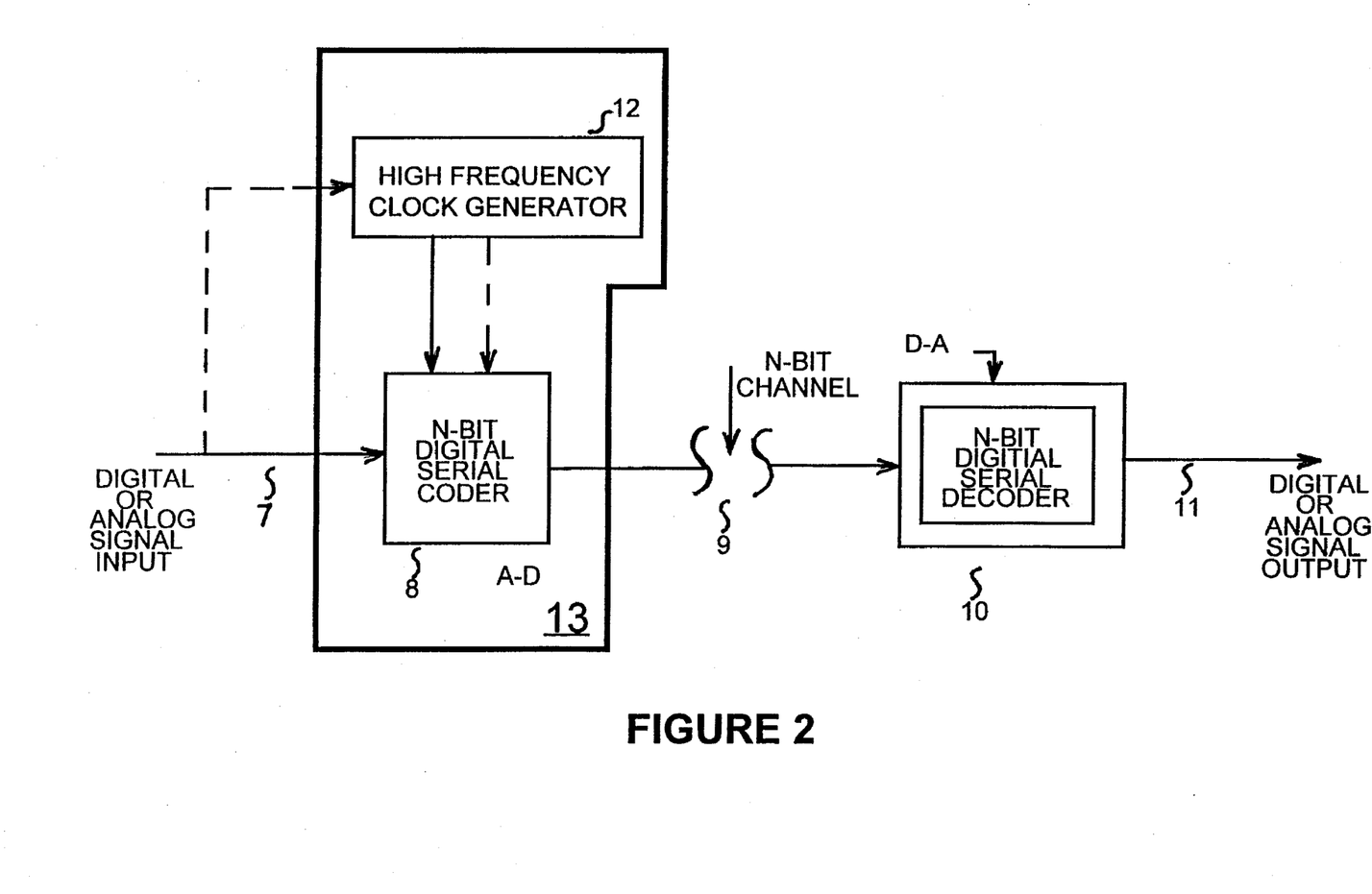
FIG. 2 is a block diagram of a first embodiment of the invention.

FIG. 2 is a block diagram of a first embodiment of the invention. While the description of FIG. 2 and the subsequent figures of the invention is made using terminology of analog and digital and signals, it should be kept in mind that the functions described may well be implemented with optical or electronic embodiments or a combination of both, there being optical equivalents for most electronic signals, for example digital optical video signal and digital electronic video signals, electronic clock generators and optical clock generators, etc. While the optical signal processing art sometimes utilizes different terminology, it will be understood that the electronic art terminology utilized herein is intended to encompass equivalent functions, devices and operations in the optical art.

FIG. 2 shows input terminal 7, analog to digital convertor 13 made up of N-bit serial coder 8 and operative to provide a serial N-Bit digital output signal for both analog and digital input signals, A-D 13 further including a high frequency clock generator 12, N-Bit serial channel 9, which may be of synchronous or asynchronous form, and D-A 10 to provide a digital or analog output signal at output terminal 11, D-A 10 including an N-Bit digital serial decoder to provide an analog signal output when an analog signal is input or a digital signal output when a digital signal is input.

It may be understood that a feature of the present invention is to facilitate the transport, coupling and use of various optical and electronic signals. The channel 9 represents many such types of transport, coupling and use, and is not specific to any particular utilization of the digital signal. It should also be noted that other methods of transmission may be utilized in channel 9, including modulated radio frequency energy and optical energy such as fiber optics, storage, such as computer or other type floppy or hard disk or Optical disk or matrix. It will be apparent to one skilled in the art from the teachings herein a method and apparatus is shown for conveniently and efficiently passing or converting input signals of a variety of types into a convenient digital form. Once the input signal is available from 13 in digital form, that digital signal may be carried or utilized in any number of fashions as are well known to one skilled in the art. It should also be noted that the A-D section 13 is useful by itself, that is without any immediate reconversion of the digital signal back to its original form, for example it may be desired to simply store the digital signal from 13 for archival or storage purposes.

For the function of generating a clock, which is phase locked to a digital bit stream as provided by 12, it is preferred that the phase locking circuit be a GS9005 supplied by Gennum Corporation of Burlington, Ontario, Canada. The GS9005 receives a digital bit stream and provides a bit clock via internal PLL. In addition, if it is desired to equalize the digital bit stream due to long cable runs, a Gennum GS9004 is well suited to this application. For analog signals, it is sufficient that the clock signal be asynchronous but stable, which the Gennum part will provide if the input signal is removed. Alternatively, the functions of 12 may be implemented in a standard cell ASIC. Gallium Arsenide technology is preferred for such ASIC and the ALSI Standard cells from TriQuent Semiconductor of Beaverton, Oregon is preferred for these circuits.

It should be noted that while applicant has referred to element 13 as an A-D convertor and element 10 as a D-A convertor, that these elements actually perform differently from the same named elements which are commonly known in the art. Applicant applies a different and much broader meaning to these names, which meaning will become apparent from the teachings herein. For a broad description of these elements, one skilled in the art should understand that both digital and analog signals may be input to A-D signal 13 and both digital and analog signals may be output from D-A 10. It is important to note that one of the features of the present invention is that a given input signal may be changed to or preserved as a high frequency serial digital bit stream, this bit stream being operated on in a relatively inexpensive manner and then output in a desired form. This operation is novel including the feature that by using a single serial bit stream to convey the input signal, no matter what the input signal form, format or bandwidth, the processing, transmission and routing of the serial bit stream is the same for all input signal types.

Normally, it is preferred that the format of the output signal match the format of the input signal, for example analog in/analog out, digital in/digital out, a given format in/the same format out. It will be understood from the teachings herein, that there is nothing preventing one skilled in the art from combining functions and adding circuitry to allow mixing and conversion such that the input and output signals may very well not be the same. Although the invention is described in its preferred embodiment as having the same type and format signal input and output, it will be understood that this teaching actually pertains to having a known relationship between the input and output such that for a given input a given output may be obtained, said relationship being controllable as desired.

Figure 3:
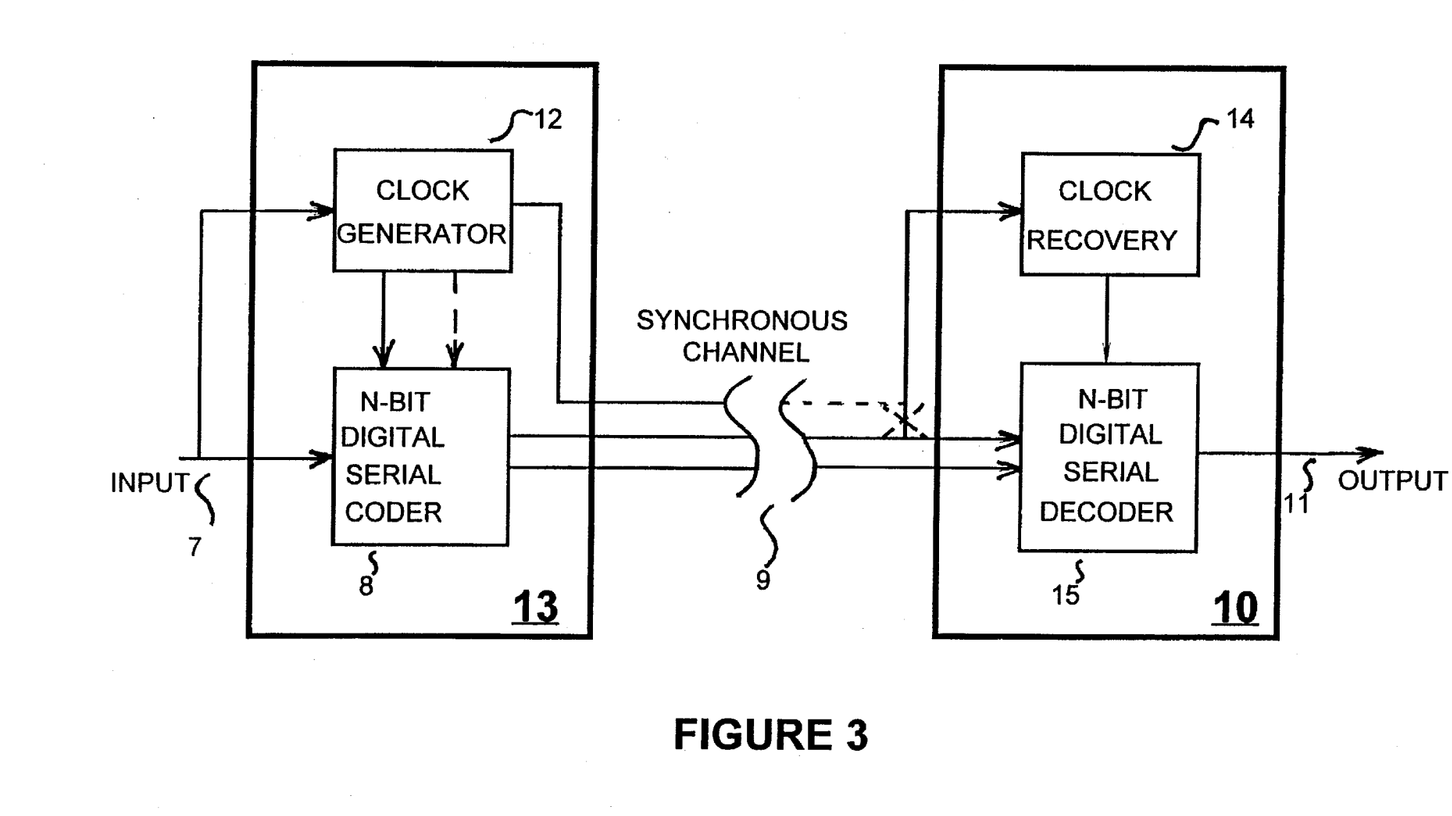
FIG. 3 is a block diagram of a second embodiment of the invention.

FIG. 3 is a block diagram of a second embodiment of the invention showing input terminal 7, analog to digital convertor 13 made up of N-bit serial coder 8 and operative to provide a serial N-Bit digital output signal for both analog and digital input signals, A-D 13 further including a high frequency clock generator 12 which is responsive to the input signal to either synchronize the clock thereto or determine the type of input signal and adjust Coder 8 in response thereto or both, the second embodiment having a synchronous N-Bit serial channel 9 which transmits the digitized input signal and may also transmit a clock signal from 12 to 14 and may also transmit signals to decoder 15 from coder 8 in response to the input signal or clock generator.

FIG. 3 further includes D-A 10 to provide a digital or analog output signal at output terminal 11, D-A 10 including an N-Bit digital serial decoder to provide an analog signal output when an analog signal is input or a digital signal output when a digital signal is input, with clock recovery circuit 14 responsive to either a clock related signal from 12 or to the digitized input signal from 8 to generate a recovered clock signal which is coupled to 15. The clock recovery circuit 14 is similar in function to clock generator 12 and is also preferred to be constructed of a Gennum GS9005.

Figure 4:
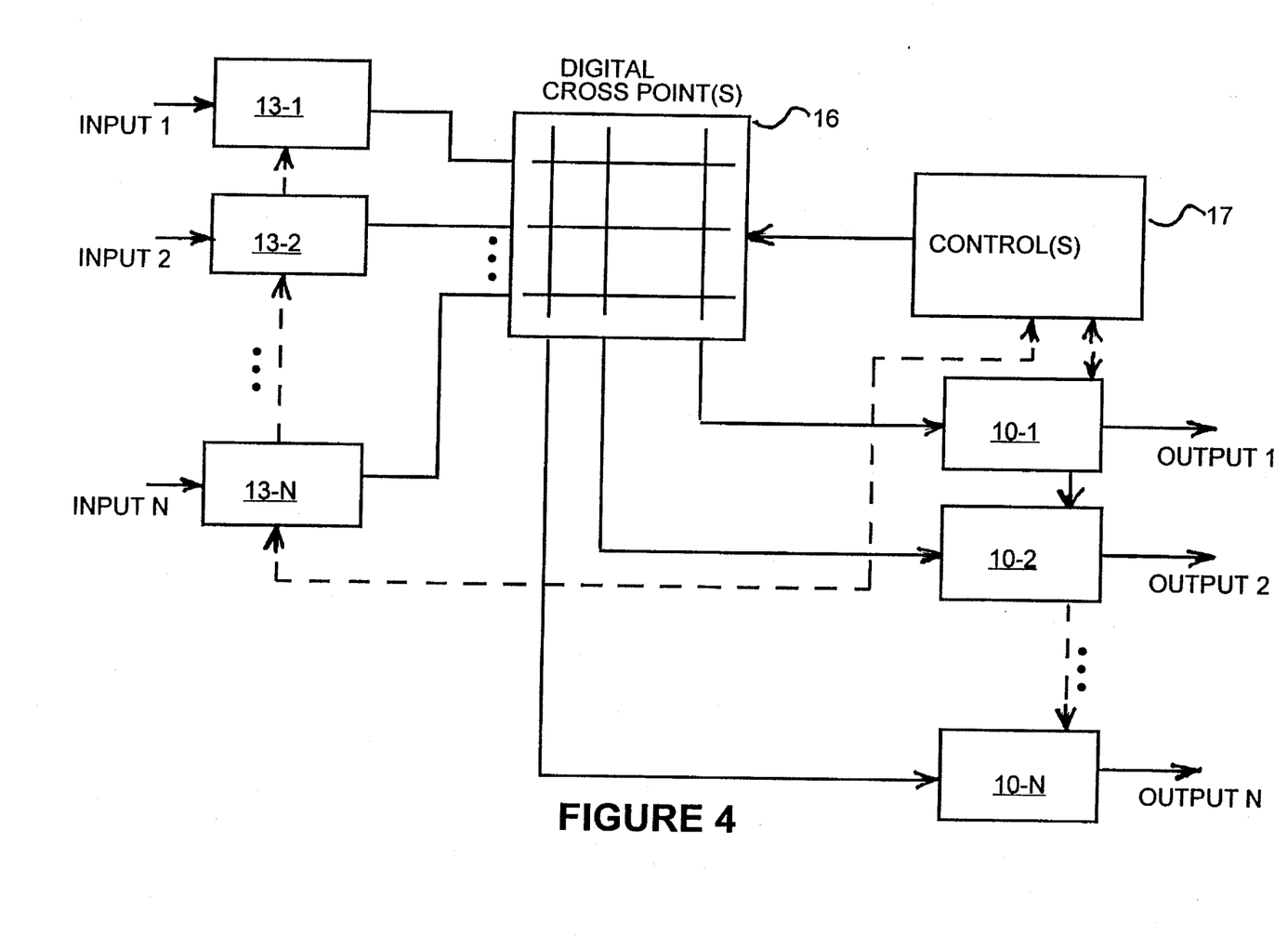
FIG. 4 is a block diagram of a routing embodiment of the invention.

FIG. 4 is a block diagram of the present invention implemented as a routing switcher configured to couple N inputs to N outputs. While the square N×N switching configuration is described, it will be understood that under the teachings herein that any switching configuration may be utilized, for example N×1, N+M× or other rectangular or polygonal configurations, including follow and break away configurations as are common in the art.

FIG. 4 shows N input A-D circuits 13-1 through 13-N, each responsive to an input signal 1-N and operating as previously described for element 13 of FIG. 2 or 3, a digital crosspoint array 16 configured to connect any of the digital data streams from 13-1 through 13-N to N outputs in any configuration, D-A convertors 10-1 through 10-N configured to receive the N digital data streams from the crosspoint array 16 and provide a digital output or analog output matching the particular input signal which is coupled to the D-A via 16 as appropriate. Crosspoint 16 is preferred to be constructed with one or more TQ8032-M 32×32 digital cross point switches provided by TriQuent Semiconductor. FIG. 4 further includes a control circuit 17 which operates to control the switching of 16 under operator or automatic operation, control 17 further controlling the A-D circuits 13 and D-A circuits 10 to allow usage of these circuits with different types of signals, for example, digital, analog, audio and video. It is preferred that control circuit 17 be implemented with a general purpose microcontroller such as the Intel 8051 series. Inclusion of LCD display and interactive devices such as keyboards and remote keypads is quite useful for many applications.

As an example, to assist in understanding the function of the control 17, it would respond to the input signal 1 via A-D 13-1 to automatically receive information of the nature of the input signal 1, for example PAL digital video, and in turn configures. 13-1 for operation with this particular signal type, for example by adjusting the gain of conditioner 18 (described later), selecting phase locking of clock generator 12 to the digital data stream of 1. In addition, control 17 operates to configure any particular D-A, for example 10-2 to operate with the PAL digital video when the crosspoint connecting 13-1 to 10-2 is closed. In this manner, the D-As 10 can be quickly configured for optimum performance for each type of signal which is being sent to it from the crosspoint 16. It is preferred that control 17 perform other functions as well, such as preventing the coupling of inappropriate signal types to the outputs, preventing unused inputs from being coupled to outputs, allowing only certain input signals to be coupled to certain outputs, either on a continuous basis or on a time changing basis, and providing emergency alternate connection if a particular input should experience some difficulty, or if a higher priority input came available or active. For example, if a device capable of handling only analog NTSC signals were connected to a particular output, control 17 would operate to allow only analog NTSC signals to be coupled to that output. Of course, if a previously different signal on a given input were changed to an analog NTSC signal, it could then be automatically included in the list of signals available to that output in response and interaction with the A-D circuit.

The control 17 may also operate to facilitate conversion of the input signal from one type to another, for example from analog to digital, by configuring additional circuitry as required. A PAL digital signal might be converted to an NTSC analog signal for example, or an analog input signal might be output as a digital signal as needed.

It should be noted that only single dotted lines are shown connecting control 17 to A-D circuits 13 and D-A circuits 10, however, it will be understood that these lines represent multiple and bidirectional interconnections as required for a particular application, and as will be easily constructed by one skilled in the art from the teachings herein.

Figure 5:
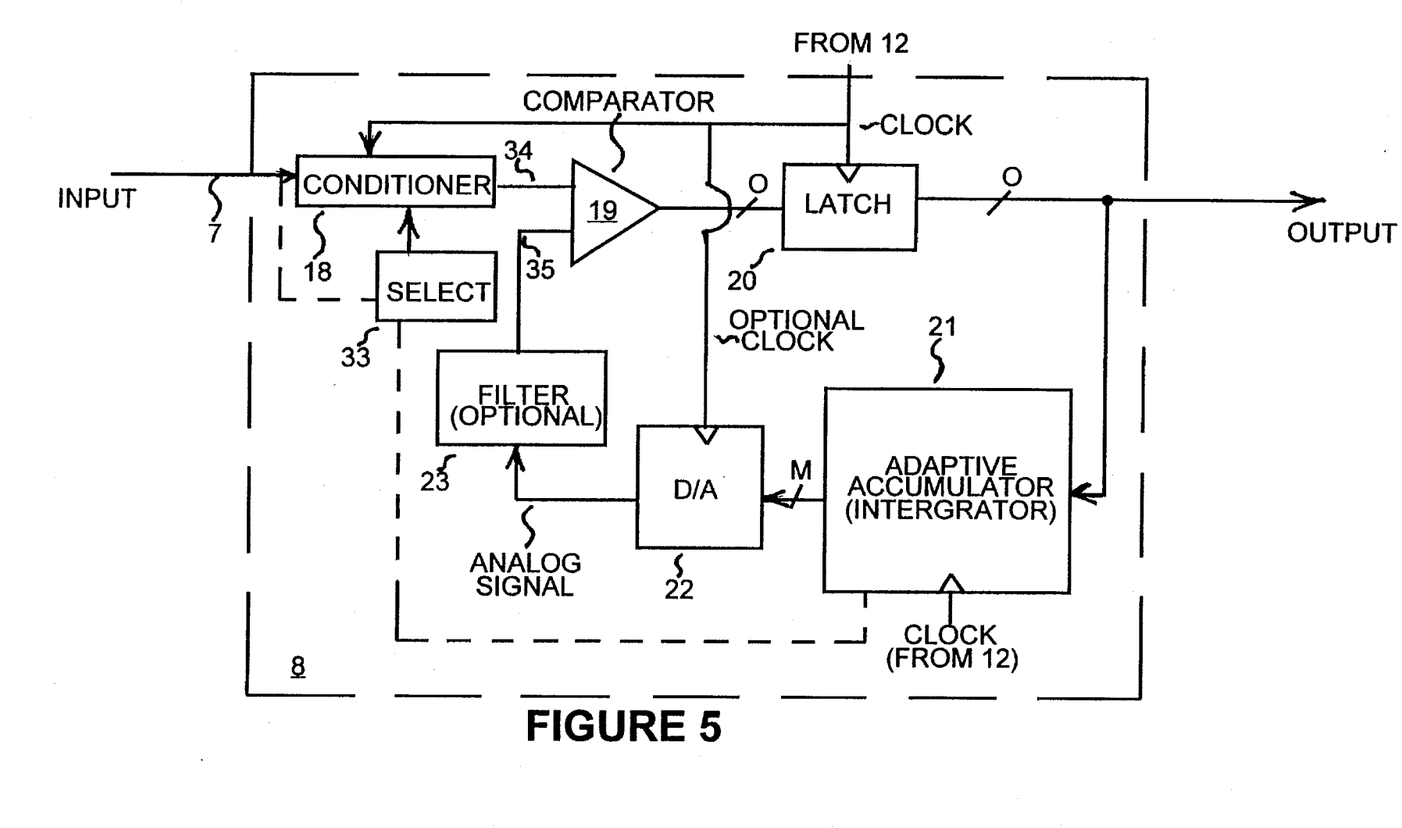
FIG. 5 is a detailed block diagram of element 8 of FIGS. 2 and 3.

FIG. 5 shows a detailed block diagram of the preferred embodiment of the N-BIT digital serial coder 8 of FIGS. 2 and 3. The input signal from input terminal 7 is coupled to a signal conditioner 18 and if desired to a selector circuit 33. The conditioner 18 buffers, adjusts the gain, equalizes, DC restores and provides other processing and conditioning of the signal as necessary as is well known to one skilled in the art. Conditioner 18 may also operate to receive an optical signal and convert it to an electrical signal by use of photo transistor or photo diode circuits as is well known in the art. It is preferred that conditioner 18 utilize a Gennum GS9004 for equalization and GS9550 for receiving and buffering digital input signals, and a Gennum GB4550A and GS4981 for receiving and buffering analog signals. Conditioner 18 also provide sample and hold function in response to the clock from 12 to output a sampled and held signal 34 for use by comparator 19 as is known in the art. It will be noted that if the rate of change of the input signal over one clock is less than 1 LSB of D/A 22 that the sample and hold function may be eliminated. In addition, the conditioner 18 may operate to provide novel adjustment the gain of the signal so that the optimum signal to noise to bandwidth ratio of analog to digital conversion may be obtained in the analog to digital conversion process. Select circuit 33 operates to detect the type of signal being input, and adjust the conditioner 18 and the adaptive accumulator parameters as desired to fit the particular signal type. The select circuit 33 may also communicate with control 17 of FIG. 4, or other control circuitry as appropriate.

FIG. 5 also shows a high speed comparator 19, preferred to be an SP93802 from Plessy Semiconductor of Scotts Valley, Calif. The comparator determines if the conditioned input signal 34 from 18 is greater or less than the reference 35 from 23. If the input is greater, a digital 1 is output and if the input is less, a digital 0 is output. While it is preferred that 19 be a one bit output device, it will be recognized by one skilled in the art that other than one bit comparators may be utilized to advantage to determine both whether the input is larger or smaller than the reference, but also how much. This capability is indicated by a width O on the output of 19 and 20. The parameter of how much greater or smaller is useful to the adaptive accumulator to change step size. The output of the comparator is latched in 20 and applied to an adaptive accumulator 21. The adaptive accumulator 21 keeps track of a number of past samples, and outputs an M bit wide digital number, which is a digital estimate of the amplitude value (in PCM like format) of the next sample of input signal from 18. It will be understood that the parameters and operation of 21 may be changed in response to a controller like 17 of FIG. 4 in order to adapt 21 to a particular input signal. This digital amplitude value is converted to an analog signal by D-A convertor 22, preferred to be a TQ6140 from TriQuent. The analog signal out-of D-A 22 is filtered by 23 to remove clock energy and the resulting filtered signal is coupled as the reference to comparator 19. The filter 23 is of standard analog type as will be known to one skilled in the art, and is preferred to be supplied by Matthey Filters, available from Television Equipment Associates, Inc. of South Salem, N.Y. It will be appreciated that if there is no significant clock energy in the analog signal from 22, that filter 23 may be eliminated and the output of 22 coupled directly to 19. Digital components such as latch 20 are preferred to be implemented in standard or Gallium Arsenide 100K ECL logic such as provided by National Semiconductor of Sunnyvale, Calif.

It will be appreciated by one skilled in the art that the particular arrangement of elements shown in FIG. 5 is given by way of example, and that the elimination or rearrangement of the elements may be resorted to without departing from the spirit and scope of the invention. For example, comparators frequently contain integral latches so that latch 20 may be eliminated if 19 has an internal latch function. Elements 21 and 22 may be replaced with an analog integrator, which integrates positive and negative charges from 20 and provides an analog signal directly to 23 or 19. Other changes, which can be utilized to implement the invention in a particular form suitable for use with a particular set of input signals will be known to one of ordinary skill in the art from the teachings herein.

Figure 6:
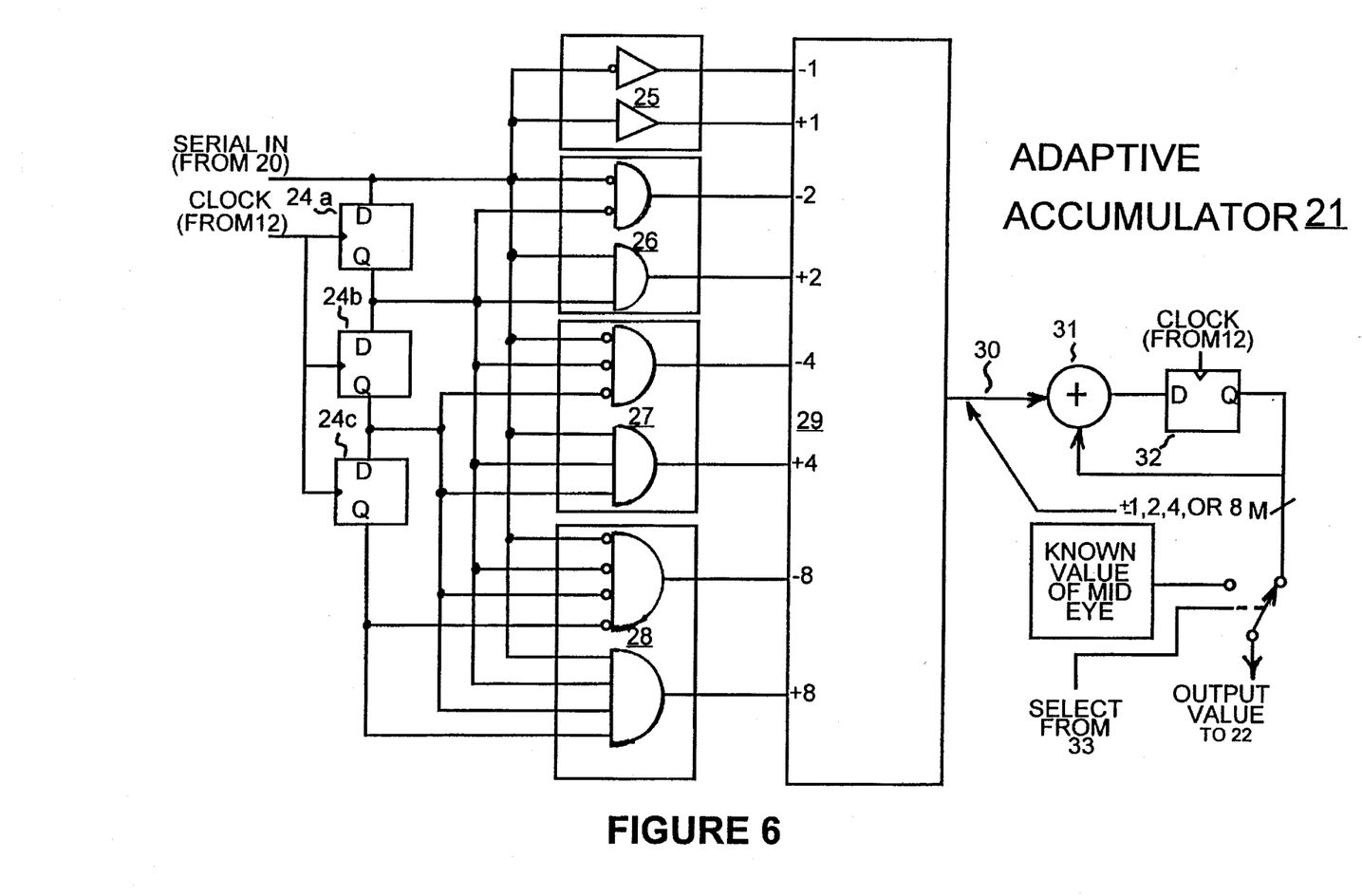
FIG. 6 is a detailed block diagram of element 21 of FIG. 5.

FIG. 6 shows a diagram of the preferred embodiment of the Adaptive Accumulator 21 of FIG. 5 which may be constructed of standard digital components preferred to be implemented in Gallium Arsenide or standard 100K ECL logic such as provided by National Semiconductor of Sunnyvale, Calif. The serial bit stream from 20 is coupled through serial shift registers 24a, 24b and 24c thus providing the previous four bits from 20 corresponding to level of the previous samples being above or below the reference. Logic 25 responds to only the first previous bit to indicate to logic 29 a need to add or subtract a 1 to the M bit number coupled to D-A 22. This need arises from the fact that the input signal sample from 18 is above or below the reference from 23. If the input is above, the reference needs to be increased and a 1 or LSB added to the reference. Similarly, logic 26 responds to only the first two previous bits to indicate to logic 29 a need to add or subtract a 2 to the M bit number coupled to D-A 22, a two being needed if the previous two bits both indicate an above or below condition of the input with respect to the reference. If the two previous bits are different, corresponding to the input signal being above the reference one period and below the other, then there would be no output from 26, as the reference would be very near the input.

Logic 27 responds to the first three previous bits to indicate to logic 29 a need to add or subtract a 4 to the M bit number coupled to D-A 22, a 4 being needed if the previous three bits all indicate the same above or below condition of the input with respect to the reference. If the three previous bits are different, corresponding to the input signal being above the reference one period and below the other, then there would be no output from 27, as the reference would be very near the input.

Logic 28, similar to 27 and 26 indicate the need to add or subtract an 8 if the previous 4 bits all indicated the same above or below condition.

Logic 29 outputs 30, the largest magnitude number to be added or subtracted as indicated by 25–28. For example, if all logic circuits indicated to add, as would be the case of all four bits from 24 and 20 were high, 29 would output +8. If all logic circuits indicated to subtract, as would be the case of all four bits from 24 and 20 were low, 29 would output −8. This largest magnitude number 30 is coupled to adder 31 where it is added to (subtracted from for negative numbers) the previous parallel output number which is held in register 32. At the next clock the new number is stored in 32. This novel circuit arrangement is similar to a type of delta modulator and has the particular characteristics of being low in cost, high in performance and particularly east to modify for use with a variety of different input signal types by simply changing the numbers which are added and subtracted as provided by 29. If it is desired to operate with high quality audio signals, it is simply accomplished by expanding the width M of the parallel output from 21 to 16, 18 or 20 bits, depending on the desired accuracy. As previously mentioned filter 23 and the sample and hold in 18 may be eliminated, this is especially true for relatively low frequency audio signals.

If the input signal is already a digital bit stream, select circuit 33 recognizes this and couples control to accumulator 21 to set a fixed reference at 19, via 22 and 23, which fixed reference is preferably set at the eye opening of the digital input signal coupled to 19. In this fashion, 19 simply acts to reclock the input digital bit stream. Select circuit 33 also operates to inform any control circuitry, such as 17 of FIG. 4, or any output circuitry, such as 10 of FIGS. 2 and 3 of the presence of digital input signal. In this fashion, the output signal may be caused to be digital, or if desired to be converted to another form for example analog. If the input signal is a parallel digital signal, a simple parallel to serial convertor may be utilized to convert the parallel digital signal to a serial digital signal. A corresponding serial to parallel convertor may be utilized in the D-A 10 if desired.

In the event where the input signal is a digital signal, it is particularly desirable to have the clocking signal provided by 12 synchronous with the bit or byte rate of the digital signal. In this event, it is desirable to have 12 phase lock the clocking signal to the input signal under command from the select circuit 33, or on its own detection of a digital input. It is preferred that the phase locking circuit be a Gennum GS9005, which receives a digital bit stream and provides a bit clock via internal PLL. In addition, if it is desired to equalize the digital bit stream due to long cable runs, a Gennum GS9004 is well suited to this application.

As previously mentioned, comparator 19 may also output both information on whether the input is greater or smaller than the reference, and information of how much greater or smaller. In this instance, a byte stream is output from 19, which byte stream may be utilized by the adaptive accumulator to change the step size. For example, if the difference is more than 1 LSB of D/A 22, the step size could be doubled. Such operation would further improve performance. It will be understood that when referring to a serial data stream or serial digital data stream, that the phrase is meant by the inventor to include both single bit streams and multiple bit streams. The terminology serial (digital) data stream is thus meant by the inventor to include a stream which is either a traditional single bit stream, as when the input signal is digital and simply passed, or is a single bit stream where the single bit indicates that the analog signal is above or below a reference, or a multiple bit stream where the information carried is indicative of an amount of deviation of the input signal above or below a reference at each clock time, where the reference is periodically changed. This should be contrasted with a parallel data stream where the multiple bit data corresponds to the input signal amplitude with respect to a fixed reference at each clock time.

In summary, the preferred embodiment of the adaptive accumulator operates with a storage mechanism responsive to the serial digital data stream to make a plurality of data (bits or bytes) of said stream simultaneously available (element 24) with a logic mechanism responsive to said plurality of data to inspect for predetermined patterns of said data (elements 25–28) and output a value 30 dependent thereon (element 29) with an arithmetic logic mechanism (elements 31 & 32) responsive to the value from 29 to add or subtract this value from a previously stored value (output of 32) and store the new value in place of the old value. This accumulated value is then compared (after being changed to analog form) to the conditioned input signal by the comparator.

Figure 7:
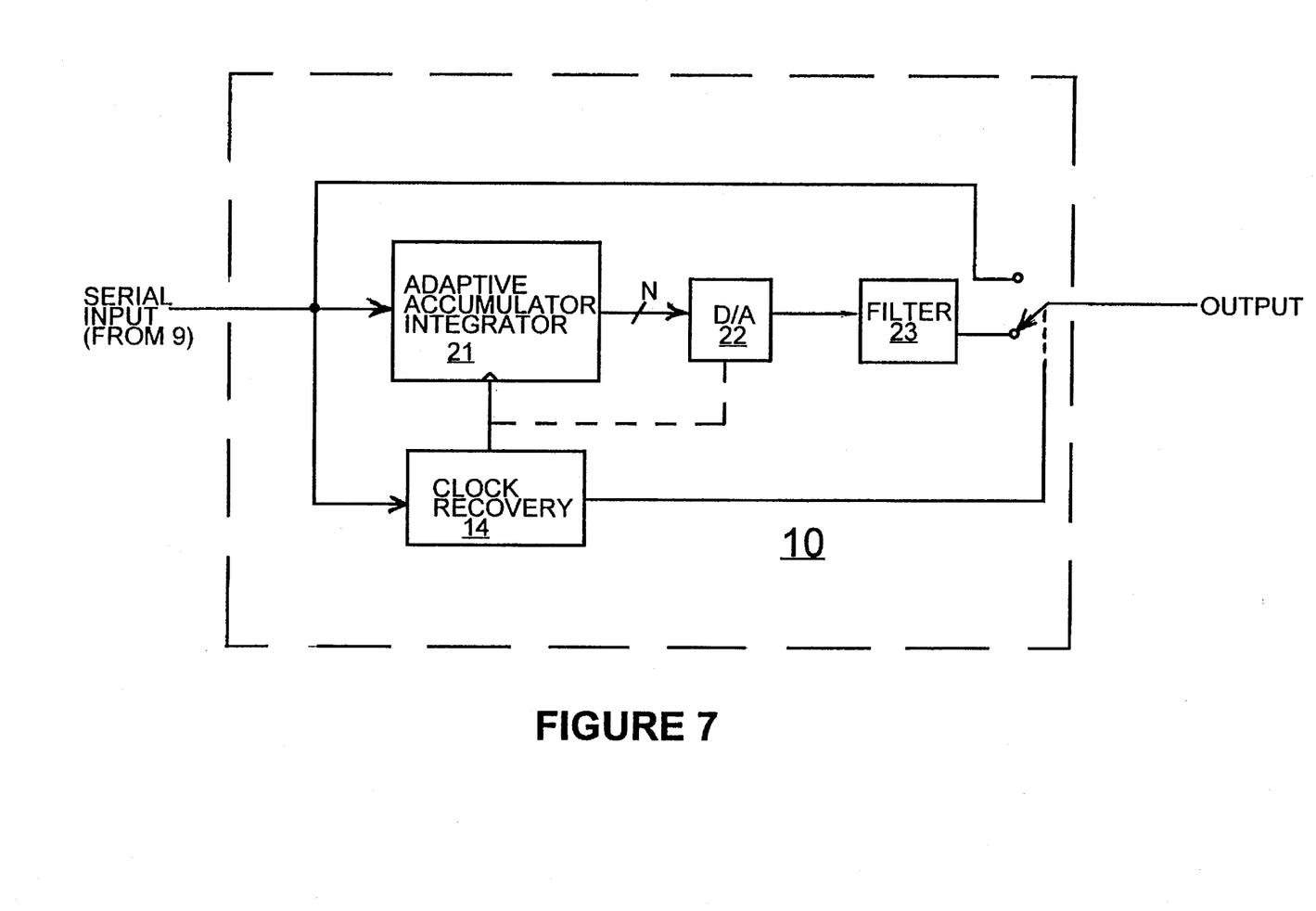
FIG. 7 is a detailed block diagram of element 10 of FIGS. 2, 3 and 4.

FIG. 7 shows the preferred embodiment of the D-A converter 10 of FIGS. 2–4. It will be recognized that FIG. 7 is comprised of some of the same components as 8 of FIG. 5, which were described above. There is a switch provided at the output to select either the analog signal from filter 23, or the digital signal from the input in response to the clock recovery circuit 14 which recognizes whether the serial input from 9 was an input analog signal encoded in delta modulation type form or was input to the A-D as a digital signal. This function is available from the suggested Gennum GS9005 as the Carrier Detect output. If the signal originated as an input analog signal, there will be no carrier detected since the delta modulation type signal does not meet the carrier characteristics of a digital video signal. Alternatively, the control circuit 17 may be coupled to the switching circuit to select either the analog or digital output.

Figure 8:
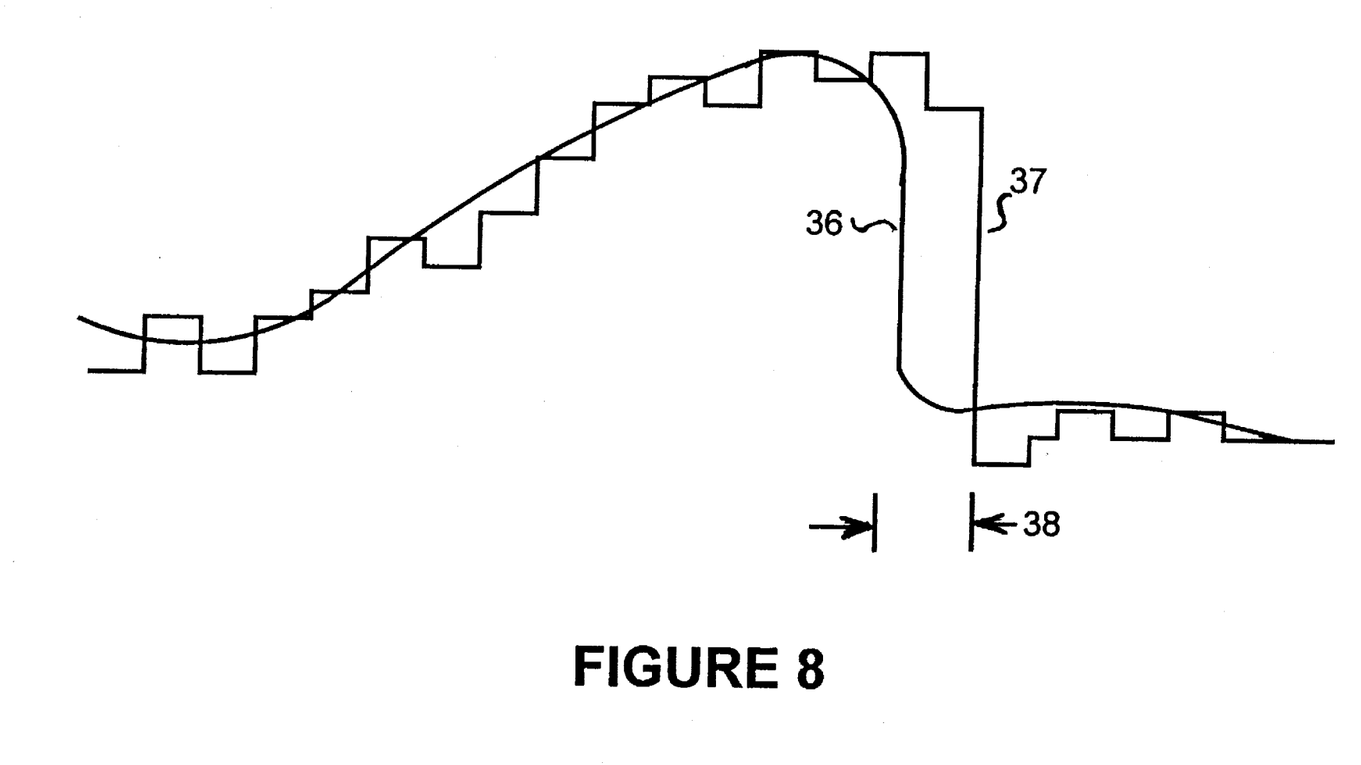
FIG. 8 is an instructive is waveform representing the input signal and reference signal of element 19 of FIG. 5.

FIG. 8 shows an instructive waveform which represents the input signal 36, corresponding to 34, and reference signal 37, corresponding to 35, as might be seen in the circuit of FIG. 5. Note on the left that as the input signal 36 changes amplitude, that the reference signal tracks the input in 1 LSB steps. Also note that where the input signal amplitude changes by more than 1 LSB per clock step of time as in area 38, that the clock to clock amplitude change of the reference changes by increasingly larger steps until the reference catches up with the input. This increase in step size results from the operation of the circuit of FIG. 6, where subsequent data bits of the same level are output from comparator 19. It may be observed that the reference signal, and thus the reconstructed analog signal at the output, does not exactly coincide with the analog input signal. The differences create noise and distortion which is undesirable. It is thus desired to tailor the operation of the Adaptive accumulator 21 to meet the particular characteristics of the particular analog signal being digitized, which characteristics may be changed automatically or under control of the control circuitry as described above. Many engineering text books deal with delta modulation and the particular need to keep noise and distortion to a minimum, and one wishing more information on the particular design choices and parameters are referred to these texts, as the considerations for a classic delta modulator are much the same for the present circuitry.

What is claimed is:

1. A system for coupling an input electronic or optical signal, which may be in analog or digital form, from one point to another, including in combination:

a) a clock generator providing a clock signal;

b) an analog to digital convertor responsive to said input signal and said clock signal to digitize said input signal thereby providing a serial digital data stream equivalent of said input signal;

circuitry in a) or b) above for determining if said input signal is an analog or digital signal and causing b) to alter its operation accordingly.

2. A system as claimed in claim 1 further including:

in b) continuously digitizing said input signal, and c) a digital decoder responsive to said serial digital data stream equivalent of said input signal to provide an output electronic signal which is equivalent to said input signal.

3. A system as claimed in claim 1 wherein said clock generator responds to said input signal to provide said clock signal at a known frequency when said input signal is in analog form and to phase lock said clock signal to said input signal when said input signal is in digital form.

4. A system as claimed in claim 1 including multiple elements a) providing multiple said serial digital data stream equivalents of the input signals and further including:

d) a switch matrix responsive to all said serial digital data stream equivalents of said input signals;

e) a control means coupled to d) and operative to cause selected switches to close thereby coupling selected serial digital data stream equivalents.

5. A system as claimed in claim 1 including multiple elements a) providing multiple said serial digital data stream equivalents of the input signals and further including:

d) a switch matrix responsive to all said serial digital data stream equivalents of said input signals;

e) a control means coupled to d) and operative to cause selected switches to close thereby coupling selected serial digital data stream equivalents;

f) a digital decoder responsive to said selected serial digital data stream equivalent of e) to provide an output electronic signal which is equivalent to said input signal.

6. A system as claimed in claim 2 wherein element c) includes a clock generator responds to said serial digital data stream equivalent of said input signal to phase lock a second clock signal thereto.

7. A system as claimed in claim 2 wherein element c) includes a clock generator responds to said clock signal of element a).

8. A system as claimed in claim 2 wherein element c) is responsive to element a) to receive information relating to the nature of said input signal.

9. A system as claimed in claim 2 wherein element c) is responsive to element b) to receive information relating to the nature of said input signal.

10. A system as claimed in claim 2 wherein element c) changes operation in response to the type of said input signal.

11. A system as claimed in claim 2 wherein element c) includes an adaptive accumulator operable in response to said serial digital data stream equivalent of said input signal to accumulate a value which at each instance of a new received bit thereof is representative of the amplitude of said input signal corresponding in time to that said data.

12. A system as claimed in claim 2 wherein element c) includes an adaptive accumulator operable in response to said serial digital data stream equivalent of said input signal which at each instance of a new received data element thereof accumulates a digital value representative of the amplitude of said input signal corresponding in time to that said data element, and with element c) further including a digital to analog convertor responsive to said digital value to convert it to an analog value.

13. A system as claimed in claim 2 wherein element c) includes a selector to select either said serial digital data stream equivalent of said input signal or an analog signal derived therefrom as the output.

14. A system for coupling electronic or optical signals from one point to another, including in combination:

a) a clock generator providing a clock signal;

b) an analog to serial digital convertor responsive to an input signal and said clock signal to provide a serial digital data stream equivalent of said input signal, including an accumulator which may be selected to be responsive to said serial digital data stream to provide a digital value which is an estimate of said input signal at given instances, a digital to analog convertor responsive to said digital value to provide an analog value and a comparator to compare said analog value to said input signal to determine the larger thereof;

circuitry in a) or b) above for determining if said input signal is an analog or digital signal and causing b) to either operate in response to said serial digital data stream as recited or to provide a known value for said digital value.

15. A system as claimed in claim 1, 2, 3, 4, 5, 6, 7, 8, 9, 10, 11, 12, 13 or 14 wherein said serial digital data stream is a single bit data stream.

16. A system as claimed in claim 1, 2, 3, 4, 5, 6, 7, 8, 9, 10, 11, 12, 13 or 14 wherein said serial digital data stream is a multiple bit data stream.

17. A system for coupling an input electronic or optical signal which may be in analog or digital form, from one point to another, including in combination:

a) a clock generator providing a clock signal;

b) an analog to serial multiple bit digital convertor responsive to said input signal and said clock signal to digitize said input signal to provide a serial digital byte stream equivalent of said input signal;

circuitry in a) or b) above for determining if said input signal is an analog or digital signal and causing b) to alter its operation accordingly.

18. An accumulator for a system for providing a serial digital data stream equivalent to an analog or digital electronic or optical input signal, said system including a clock generator providing a clock signal and an analog to digital convertor responsive to the input signal and said clock signal to provide a serial digital bit stream equivalent of said input signal, said accumulator being part of said analog to digital convertor, said accumulator including:

circuitry responsive to a signal indicating if said input signal is an analog or digital signal to alter said accumulator's operation to either output a known number if said input signal is a digital signal, or be responsive to said serial digital data stream to provide a digital value which is an estimate of said input signal amplitude at given instances.

19. A method for coupling electronic or optical signals from one point to another, including in combination:

a) providing a clock signal;

b) digitizing an input signal, which may be in analog or digital form, in response to said clock signal to provide a serial digital data stream equivalent of said input signal;

c) determining if said input signal is an analog or digital signal and causing step b) to alter its digitizing operation accordingly.

* * * * *